(12) United States Patent
Diez Herrera (10) Patent No.: US 12,546,347 B2
(45) Date of Patent: Feb. 10, 2026

(54) FASTENING CLIP ASSEMBLY

(71) Applicant: Illinois Tool Works Inc., Glenview, IL (US)

(72) Inventor: Victor Diez Herrera, Sabadell (ES)

(73) Assignee: Illinois Tool Works Inc., Glenview, IL (US)

( * ) Notice: Subject to any disclaimer, the term of this patent is extended or adjusted under 35 U.S.C. 154(b) by 43 days.

(21) Appl. No.: 18/752,660

(22) Filed: Jun. 24, 2024

(65) Prior Publication Data
US 2025/0012305 A1    Jan. 9, 2025

(30) Foreign Application Priority Data

Jul. 4, 2023  (EP) ..................................... 23382688
Jul. 4, 2023  (EP) ..................................... 23382689
Jun. 7, 2024  (EP) ..................................... 24180865

(51) Int. Cl.
*F16B 2/24*  (2006.01)
*F16B 21/08*  (2006.01)

(52) U.S. Cl.
CPC ............ *F16B 2/243* (2013.01); *F16B 21/086* (2013.01)

(58) Field of Classification Search
CPC .... F16B 2/243; F16B 21/086; F16B 19/1081; F16B 2/02; B60R 21/213; B60R 21/217; B60R 21/23138; B60R 21/232
See application file for complete search history.

(56) References Cited

U.S. PATENT DOCUMENTS

| | | |
|---|---|---|
| 7,900,953 B2 | 3/2011 | Slobodecki |
| 8,474,111 B2 | 7/2013 | Ribes Marti |
| | (Continued) | |

FOREIGN PATENT DOCUMENTS

| | | |
|---|---|---|
| CN | 105041796 | 11/2015 |
| CN | 209990755 U | 1/2020 |
| | (Continued) | |

OTHER PUBLICATIONS

The extended European search report for Application No. 24180865.8, dated Nov. 8, 2024, European Patent Office, Germany (9 pages).

*Primary Examiner* — David M Upchurch
(74) *Attorney, Agent, or Firm* — McAndrews, Held & Malloy, Ltd.

(57) ABSTRACT

A fastening clip assembly is provided. It comprises a fastening clip, with a head portion to be positioned against a first surface of a component and a body portion for extending through the hole in the component, the body portion comprising an internal cavity and one or more elastically deflectable retaining members extending out of the internal cavity to engage a second surface of the component, opposite to the first surface, to retain the fastening clip assembly in the hole of the component, and an insert, configured to be inserted through an opening in the head portion of the fastening clip and into the internal cavity. The elastically deflectable retaining members are adapted to deflect inwardly in a deflecting direction as the body portion is pushed through the hole, and the insert comprises an engaging surface to engage an end of one of the elastically deflectable retaining members within the internal cavity, the end of the elastically deflectable retaining member comprising a bent section.

14 Claims, 4 Drawing Sheets

(56) References Cited

U.S. PATENT DOCUMENTS

| | | | |
|---|---|---|---|
| 8,646,155 | B2 | 2/2014 | Ribes Marti |
| 9,009,928 | B2 | 4/2015 | Binkert |
| 10,202,995 | B2 | 2/2019 | Stickelberger |
| 10,590,969 | B2 | 3/2020 | Binkert |
| 10,800,371 | B2 | 10/2020 | Marini |
| 11,261,898 | B2 * | 3/2022 | Ammann ................ F16B 2/22 |
| 11,384,779 | B2 | 7/2022 | Binkert |
| 11,441,587 | B2 | 9/2022 | Binkert |
| 11,519,437 | B2 | 12/2022 | Binkert |
| 2014/0109357 | A1 * | 4/2014 | Fischer ................ F16B 21/086 |
| | | | 24/455 |
| 2015/0300388 | A1 * | 10/2015 | Maschat ................ F16B 2/243 |
| | | | 24/458 |
| 2016/0356298 | A1 * | 12/2016 | Pquet ................ F16B 21/065 |
| 2020/0392973 | A1 | 12/2020 | Ammann |
| 2022/0228611 | A1 | 7/2022 | Cobacho |
| 2024/0018983 | A1 | 1/2024 | Murray |
| 2024/0060522 | A1 | 2/2024 | Ribes Martí |
| 2024/0109501 | A1 | 4/2024 | Li |

FOREIGN PATENT DOCUMENTS

| | | |
|---|---|---|
| CN | 212796780 U | 3/2021 |
| CN | 213176368 U | 5/2021 |
| CN | 114607690 A | 6/2022 |
| DE | 202017006938 | 12/2018 |
| DE | 102018006297 A1 | 2/2020 |
| DE | 102021203314 A1 | 10/2022 |
| DE | 102022132877 A1 | 6/2023 |
| EP | 1584521 B1 | 4/2008 |
| EP | 2217815 | 8/2010 |
| EP | 2263014 | 12/2010 |
| EP | 2605936 | 6/2013 |
| EP | 2404067 B1 | 10/2015 |
| EP | 2670988 B1 | 10/2015 |
| EP | 2536958 B1 | 11/2015 |
| EP | 2937575 B1 | 1/2017 |
| EP | 3245410 | 11/2017 |
| EP | 3303851 | 4/2018 |
| EP | 3325315 | 5/2018 |
| EP | 3325818 A1 | 5/2018 |
| EP | 3443232 | 2/2019 |
| EP | 3452732 | 3/2019 |
| EP | 3478975 | 5/2019 |
| EP | 3452734 B1 | 9/2019 |
| EP | 3748169 A1 | 12/2020 |
| EP | 3754207 A1 | 12/2020 |
| EP | 3822497 A1 | 5/2021 |
| EP | 2356342 B2 | 7/2021 |
| EP | 3443233 B1 | 1/2022 |
| EP | 4141742 | 3/2023 |
| EP | 4253769 A1 | 10/2023 |
| EP | 4357628 A2 | 4/2024 |
| WO | 2012150004 | 11/2012 |
| WO | 2020023870 A1 | 1/2020 |
| WO | 2020030475 A1 | 2/2020 |

* cited by examiner

FASTENING CLIP ASSEMBLY

RELATED APPLICATIONS

The present application claims the benefit of European Patent Application Nos. 23382688.2, filed Jul. 4, 2023, 23382689.0, filed Jul. 4, 2023, and 24180865.8, filed Jun. 7, 2024, each titled "Fastening Clip Assembly," the contents of which are hereby incorporated by reference.

TECHNICAL FIELD

This disclosure generally relates to the field of fasteners and in particular, to the field of fastening clips for attaching one or more components, such as airbag devices, to an external structure. More specifically, the present disclosure relates to a fastening clip assembly for attaching a side-impact airbag or curtain-type airbag to a vehicle structure.

BACKGROUND

Airbags are safety devices used in the motor industry and which, in combination with other safety components, such as seatbelts, help to reduce fatal accidents in the case of collisions. The tests to which the vehicles have been subjected, as well as mortality statistics, have clearly demonstrated that the use of airbags can considerably improve the safety of automobile occupants and, when combined with other forms of passive safety, such as seat belts, significantly reduce mortality in the case of serious accidents.

Today, manufacturers produce frontal airbags, which are designed to protect the driver and/or passenger in the event of a head-on collision and, considering their positions, lateral airbags that are installed behind the posts and/or in the sides of the vehicle seats, along with curtain airbags.

Airbags of the curtain type are usually located in the part close to the roof on the sides of the automobile, e.g. situated above the front and rear doors. Such airbags have very rigorous requirements with regard to the goals set for them and the technical challenges that have to be overcome. Typical challenges may be their location in the vehicle and the way they are fastened, required deployment time and the time that the airbag is required to remain inflated. Other challenges may come from the fact that there is only a short distance between the body and the occupant and that there is little vehicle material between the occupant and an impacting vehicle. For example, it is essential that airbags are deployed in a fraction of a second, giving rise to an enormous snatch force on their attachment components, which then suffer the consequences of that impact.

Further, when installing new or restore previously deployed airbags, it is well known in the industry that the installation or restoration is tedious work, comprising steps, such as, (i) dismantling all the attachments of the airbag, (ii) replacing the airbag and installing a new one, and then again (iii) fitting all its attachments. The work involved generally requires the installer to at least partly manually assemble the clip components with the airbag and push the assembly into a vehicle panel or structure to attach or operably couple the airbag to the vehicle.

SUMMARY

The present disclosure relates generally to a fastening clip assembly, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures, where like or similar reference numbers refer to like or similar structures. The figures are not necessarily to scale, emphasis instead being placed upon illustrating the principles of the devices, systems, and methods described herein.

FIG. 1 shows (a) a first side view and (b) a second side view of a first example of the fastening clip assembly.

FIG. 2 shows (a) a first side cross-sectional view and (b) a second side cross-sectional view of the first example of the fastening clip assembly.

FIGS. 3(a) and (b) show an enlarged view of the bent section of the elastically deflectable retaining members and the engaging surface of the insert of the first example of the fastening clip assembly.

FIGS. 4(a) and (b) show an enlarged view of the bent section of the elastically deflectable retaining members and the engaging surface of the insert of a second example of the fastening clip assembly.

DETAILED DESCRIPTION

The described example relates to a fastening clip suitable for securing paraphernalia and accessories. The example(s) of the disclosure are normally applied in vehicles. Although the disclosure is described with respect to vehicles, the disclosure is not restricted to vehicles altogether, but may also be used in other structures requiring attachment of accessories or peripheral components to a structure.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centerline or a geometric center of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

According to a first aspect of the disclosure there is provided a fastening clip assembly for mounting in a hole of a component, the fastening clip assembly comprising: a fastening clip, comprising a head portion adapted to be positioned against a first surface of the component and a body portion for extending through the hole in the component, the body portion comprising an internal cavity and one or more elastically deflectable retaining members extending out of the internal cavity to engage a second surface of the component, opposite to the first surface, to retain the fastening clip assembly in the hole of the component, and an insert, configured to be inserted through an opening in the head portion of the fastening clip and into the internal cavity; wherein the one or more elastically deflectable retaining members are adapted to deflect inwardly in a deflecting direction as the body portion is pushed through the hole of the component, and wherein the insert comprises an engaging surface arranged to engage an end of one of the one or more elastically deflectable retaining members within the internal cavity, and wherein the end of the elastically deflectable retaining member comprises a bent section.

The bent section is advantageous in multi-material systems as it ensures the elastically deflectable retaining member provides only a glancing contact with other parts, thereby preventing the elastically deflectable retaining member from digging in, snagging, or damaging further parts if e.g. the elastically deflectable retaining member is formed of a harder material (such as a sprung metal) compared to a further part (e.g. a soft plastic such as polypropylene). Furthermore, the bent section can achieve the same effect as forming the elastically deflectable retaining member to have a rounded end or smoothed impacting end without the need to extra, separate, manufacturing steps. The bent section also minimized the amount of space required while still providing the above benefit compared to a rounded end/head, therefore the size of the fastening clip may be minimized by comparison. The amount of motion required to use the clip is also minimized (i.e. the distance a user has to push an insert into the clip is reduced).

Suitably, the bent section comprises a curved surface configured to abut the engaging surface of the insert within the internal cavity. By ensuring a curved surface is provided on the bent section the effect of the bent section may be further improved as the risk of snagging, damage, or digging in of the elastically deflectable retaining member into a further part is additionally minimized.

Appositely, the bent section extends at a first angle relative to the engaging surface of the insert, and wherein the first angle is from approximately 0 to 120 degrees relative to the engaging surface such that an edge of the end of the elastically deflectable retaining member does not contact the engaging surface when the insert is located in the internal cavity. Here 0 degrees would mean that the bent section is parallel with the engaging surface and at 90 degrees the bent section would be perpendicular to the engaging surface. At such angles it is clear that an edge may not dig into or snag on the engaging surface, thereby avoiding damage to the engaging surface.

Preferably, the bent section of the one or more elastically deflectable retaining members comprises a first portion extending towards the head portion of the fastening clip, a second portion extending at an angle relative to the first portion, and a curved portion extending between first portion and the second portion. In this way the bent section is composed of three distinct sections.

Optionally, the curved portion comprises a curved surface. It is noted a curved portion may be formed of multiple straight sections, so the meaning of curved surface is a surface that defines a curve and possess at least one radius of curvature. Where multiple radii of curvature are present the transition from one radius to another radius is substantially continuous.

Suitably, the second portion extends at an angle of approximately 0 to 90 degrees relative to the first portion. Here 0 degrees would mean that the second portion is parallel with the first portion but running in the opposite direction, and at 90 degrees the second portion would be perpendicular to the direction of travel of the first portion.

Appositely, the second portion extends at an angle of approximately 80 to 90 degrees relative to the first portion.

Appropriately, the second portion extends at an angle of approximately 0 to 10 degrees relative to the first portion. Where the first and second portions are formed from a single piece of material folded over on itself, the second portion could be considered to be arranged at an angle of between 350 and 360 degrees relative to the first portion.

Optionally, the body portion comprises: a first side, with first and second elastically deflectable retaining members extending from the first side of the body portion, and a second side, opposite to the first side, with third and fourth elastically deflectable retaining members extending from the second side of the body portion such that the third elastically deflectable retaining member is opposite to the first elastically deflectable retaining member and the fourth elastically deflectable retaining member is opposite to the second elastically deflectable retaining member. The elastically deflectable retaining member may be placed in an expanded position when the clip is used, such that a width of the clip is greater in the expanded position, thereby preventing removal of the clip from an aperture into which the clip is placed and then expanded.

Suitably, within the internal cavity, the first and fourth elastically deflectable retaining members extend to a first height towards the head portion, and the second and third elastically deflectable retaining members extend to a second height towards the head portion, and wherein the first height is greater than the second height such that the elastically deflectable retaining members do not collide as they are deflected inwardly during use. The use of different relative heights prevents interference of the elastically deflectable retaining members with each other.

Appositely, the first and fourth elastically deflectable retaining members comprise the bent section.

Appropriately, the insert comprises a first leg comprising the engaging surface, and a second leg comprising a second engaging surface, and wherein the engaging surface of the first leg is arranged to engage the first elastically deflectable retaining member and second engaging surface of the second leg is arranged to engage the fourth elastically deflectable retaining member.

Optionally, the first leg is offset from the second leg such that the first leg is arranged to engage the first elastically deflectable retaining member and the second leg is arranged to engage the fourth elastically deflectable retaining member. This further reduces the chance of inappropriate interference of the elastically deflectable retaining member with each other.

Suitably, the insert is moveable in the internal cavity of the fastening clip between: an initial position, in which the engaging surface engages the bent section of one of the one or more elastically deflectable retaining members for pushing the fastening clip assembly into the hole of the component, and a locked position, in which the engaging surface does not engage the bent section of the one of the one or more elastically deflectable retaining members. Locking the insert within the clip ensures that the clip stays in an expanded position and remains in the place it is situated and may not work free via vibrations for example.

According to a second aspect of the disclosure there is provided a fastening clip for mounting in a hole of a component, the fastening clip comprising: a head portion adapted to be positioned against a first surface of the component, and a body portion for extending through the hole in the component, the body portion comprising: an internal cavity, a first side with first and second elastically deflectable retaining members extending from the first side of the body portion, and a second side, opposite to the first side, with third and fourth elastically deflectable retaining members extending from the second side of the body portion such that the third elastically deflectable retaining member is opposite to the first elastically deflectable retaining member and the fourth elastically deflectable retaining member is opposite to the second elastically deflectable retaining member, wherein each of the elastically deflectable retaining members extend out of the internal cavity and are deflectable inwardly as the body portion is pushed through the hole of the component so as to engage a second surface of the component, opposite to the first surface, to retain the fastening clip assembly in the hole of the component, and wherein, within the internal cavity, the first and fourth elastically deflectable retaining members extend to a first height towards the head portion, and the second and third elastically deflectable retaining members extend to a second height towards the head portion, and wherein the first height is greater than the second height such that the elastically deflectable retaining members do not collide as they are deflected inwardly during use.

In this way, via the use of first and second heights, it can be ensured that the elastically deflectable retaining members do not interfere with one another during use of the clip which impairs the correct function of the clip.

There may be provided a fastening clip assembly for mounting in a hole of a component, the fastening clip assembly comprising: the fastening clip as described above, and an insert configured to be inserted through an opening in the head portion of the fastening clip and into the internal cavity.

Suitably, the insert comprises an engaging surface arranged to engage one of the elastically deflectable retaining members within the internal cavity.

Appositely, the insert comprises a first leg comprising the engaging surface, and a second leg comprising a second engaging surface, and wherein the engaging surface of the first leg is arranged to engage the first elastically deflectable retaining member and second engaging surface of the second leg is arranged to engage the fourth elastically deflectable retaining member.

Appropriately, the first leg is offset from the second leg such that the first leg is arranged to engage the first elastically deflectable retaining member and the second leg is arranged to engage the fourth elastically deflectable retaining member.

Optionally, an end of at least one of the elastically deflectable retaining members comprises a bent section. The bent section shares the same advantages as the bent section of the first aspect of the disclosure.

Suitably, the first and fourth elastically deflectable retaining members comprise the bent section.

Appositely, the bent section comprises a curved surface configured to abut the engaging surface of the insert within the internal cavity. The curved surface shares the same advantages as the curved surface of the first aspect of the disclosure.

Appropriately, the bent section extends at a first angle relative to the engaging surface of the insert, and wherein the first angle is from approximately 0 to 120 degrees relative to the engaging surface such that an edge of the end of the elastically deflectable retaining member does not contact the engaging surface when the insert is located in the internal cavity.

Suitably, the bent section comprises a first portion extending towards the head portion of the fastening clip, a second portion extending at an angle relative to the first portion, and a curved portion extending between first portion and the second portion. Appropriately, the curved portion comprises the curved surface. Appositely, the second portion extends at an angle of approximately 0 to 90 degrees relative to the first portion. Suitably, the second portion extends at an angle of approximately 80 to 90 degrees relative to the first portion. Optionally, the second portion extends at an angle of approximately 0 to 10 degrees relative to the first portion.

Appropriately, the insert is moveable in the internal cavity of the fastening clip between: an initial position in which the engaging surface engages one of the elastically deflectable retaining members for pushing the fastening clip assembly into the hole of the component, and a locked position in which the engaging surface does not engage the elastically deflectable retaining members. The locked position shares the same advantages as the locked position of the first aspect of the disclosure.

Figure 1:
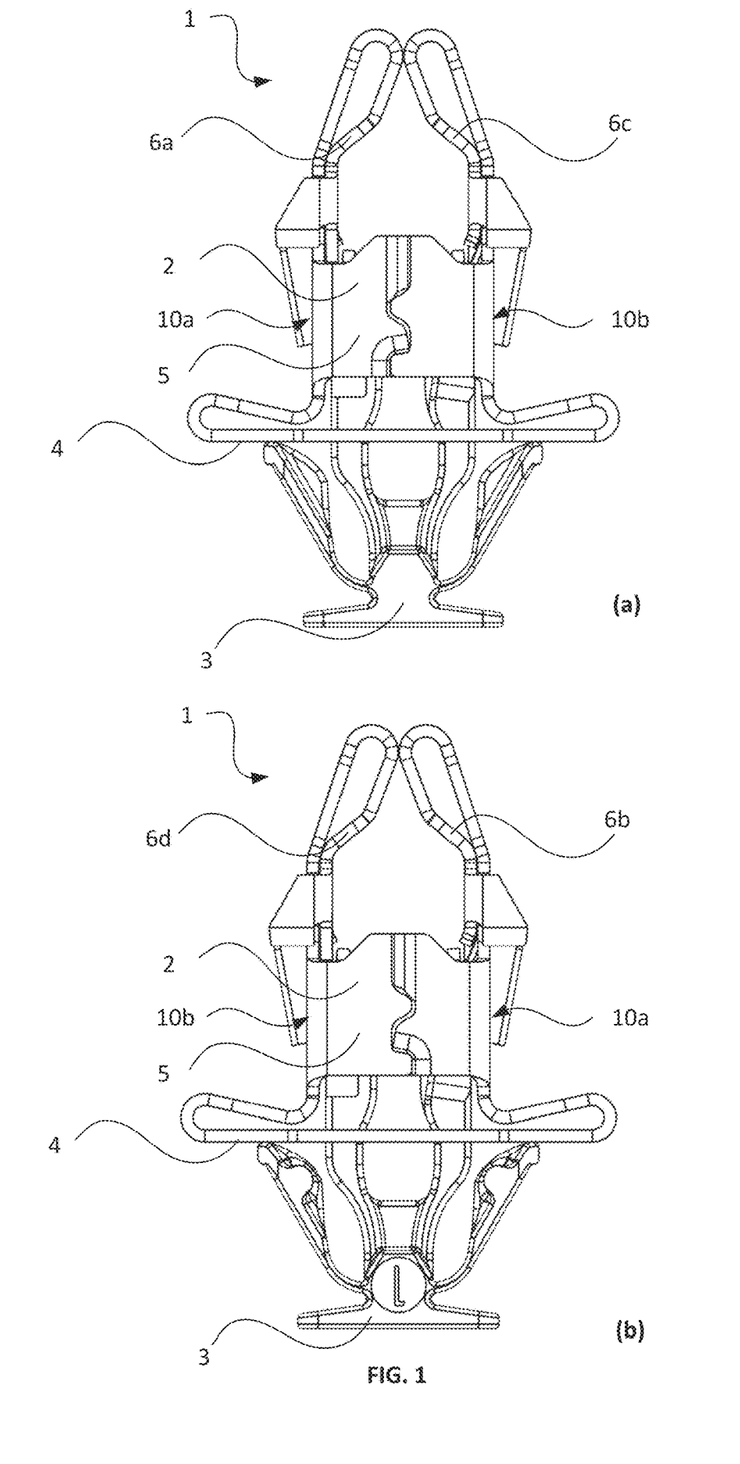

FIGS. 1(a) and 1(b) show a fastening clip assembly 1 comprising a fastening clip 2 and an insert 3. As described in more detail hereinafter, the fastening clip 2 comprises a head portion 4, a body portion 5 extending from the head portion 4, and first, second, third and fourth elastically deflectable retaining members 6a, 6b, 6c and 6d. The insert 3 is insertable into the fastening clip 2 and during assembly with a component, the insert 3 moves between an initial position, shown in FIG. 1, and a locked position (not shown).

The fastening clip 2 is formed from a folded sheet. The folded sheet is a single piece of material, preferably sheet metal such as stainless steel, folded to form the head portion 4 and the body portion 5.

Figure 2:
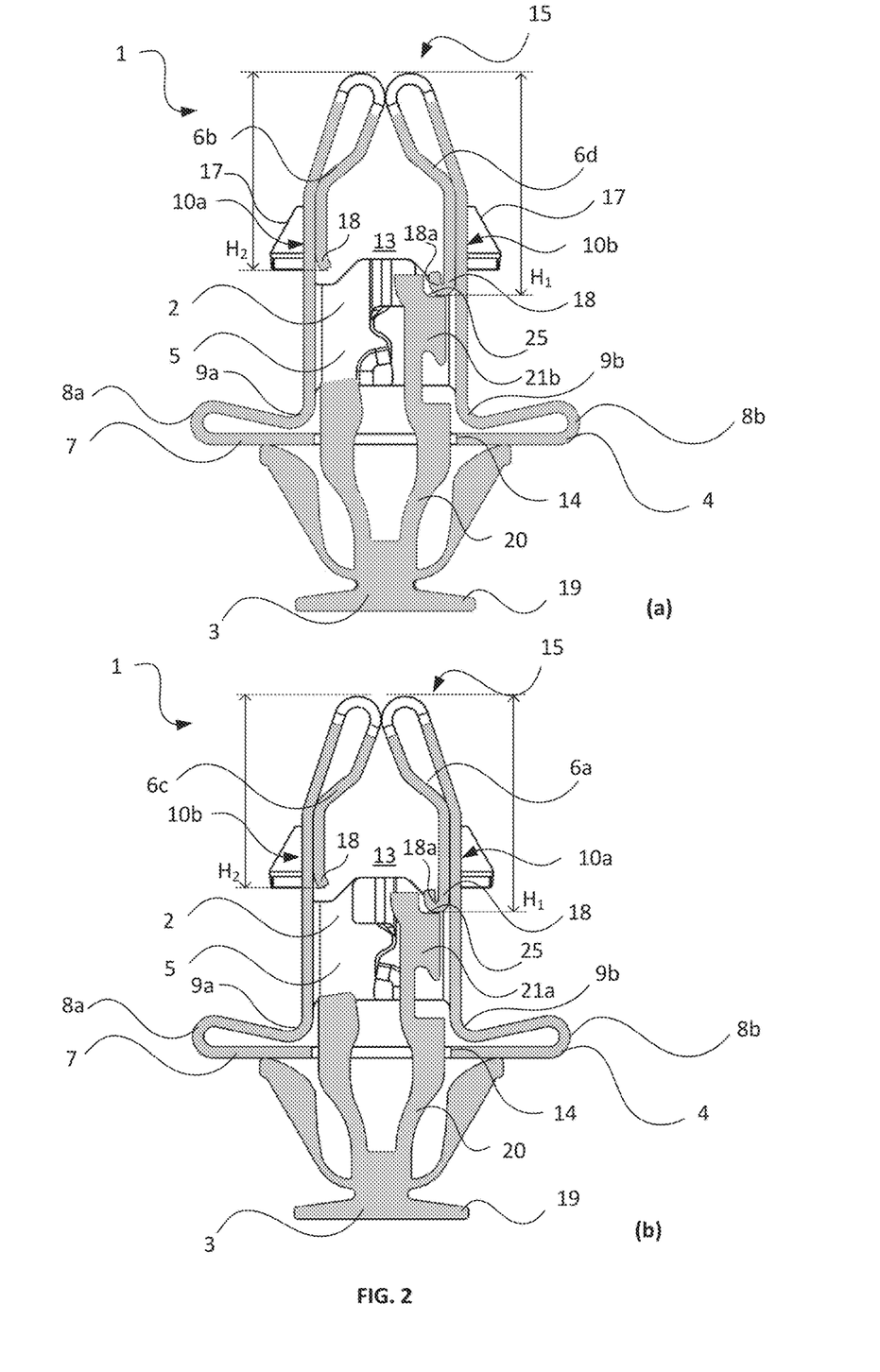

FIGS. 2(a) and 2(b) show a cross-section of the fastening clip assembly 1. The head portion 4 comprises a planar (i.e., flat) top wall 7. The head portion 4 comprises first and second bends 8a, 8b at opposite ends of the top wall 7. The first and second bends 8a, 8b extend into opposing bends 9a, 9b that extend into first and second sections 10a, 10b of the body portion 5. The first and second bends 8a, 8b and opposing bends 9a, 9b form double bends that join the head portion 4 to the body portion 5. First and second sides 10a, 10b of the body portion 5 are substantially parallel to each other and spaced apart. The width of the body portion 5, between the first and second sides 10a, 10b, is less than the width of the head portion 4 due to the double bends. Accordingly, when the body portion 5 is mounted in the hole of the component the head portion 4 abuts the surface of the component.

The top wall 7 comprises an opening 14 to receive the insert 3 as described hereinafter.

The body portion 5 also comprises the first, second, third and fourth retaining members 6a, 6b, 6c, 6d, which may be elastically deformable retaining members. As shown, each of the retaining members 6a, 6b, 6c, 6d extends from a distal end 15 of the body portion 5 opposite to the head portion 4.

The first and second retaining members 6a, 6b extend from the distal end 15 of the first side 10a of the body portion 5. The third and fourth retaining members 6c, 6d extend from the distal end 15 of the second side 10b of the body portion 5. The third retaining member 6c extends opposite the first retaining member 6a, and the fourth retaining member 6d extends opposite the second retaining member 6d.

Each of the retaining members 6a, 6b, 6c, 6d are bent inwardly into the internal cavity 13. A retaining portion 17 of each of the retaining members 6a, 6b, 6c, 6d extends through an opening in the first section 10a of the body portion 5. The retaining portion 17 of each of the retaining members 6a, 6b, 6c, 6d is thereby provided externally of the body portion 5. An end 18 of the first retaining member 6a is disposed in the internal cavity 13. The end 18 of each of the first and fourth retaining members 6a, 6d, has a bent section 18a. The bent section 18a bends inwardly into the internal cavity 13. The end 18 of each retaining member 6a, 6b, 6c, 6d is not directly connected to the body portion 5 and so can move within the internal cavity 13. In particular, each retaining member 6a, 6b, 6c, 6d is elastically deflectable so that the retaining portion 17 can move into the internal cavity 13 during mounting, and will spring back out to the position shown in FIGS. 2(a) and 2(b) once the fastening clip 2 has been mounted in the hole.

Each of the retaining members 6a, 6b, 6c, 6d are elastically deflectable and act to retain the fastening clip 2 in a hole of a component during use, as described further hereinafter.

The first and fourth retaining members 6a, 6d extend from the distal end 15 towards the head portion 4 and have a first height H1. The second and third retaining members 6b, 6c extend from the distal end 15 towards the head portion 4 and have a second height H2. The first height H1 and the second height H2 are the largest dimension of the retaining members 6a, 6b, 6c, 6d from the distal end 15 to the end 18 proximate to the head portion 4. In other words, the first height H1 and the second height H2 are the largest dimension of the retaining members 6a, 6b, 6c, 6d along an axis parallel to a central longitudinal axis of the fastening clip 2. The first height H1 is greater than the second height H2 such that, as the retaining members 6a, 6b, 6c, 6d deflect inwardly during mounting, the first and fourth retaining members 6a, 6d do not collide with the opposing second and third retaining members 6b, 6c.

The insert 3 comprises a head portion 19 and a body portion 20. The body portion 20 has a first leg 21a and a second leg 21b. The first leg 21a and the second leg 21b are formed on opposite sides of the insert 3. The first leg 21a and the second leg 21b are offset from one another about a central longitudinal plane of the insert 3. The first leg 21a and the second leg 21b are separate and so can deflect towards and away from each other, as described further hereinafter.

The insert 3 is preferably formed from a polymer, such as, for example, polyoxymethylene. Preferably, the insert 3 is injection molded.

Each one of the first leg 21a and the second leg 21b comprises an engaging surface 25 arranged to engage the first and fourth retaining members 6a, 6d when the fastening clip assembly 1 is assembled. The engaging surfaces 25 face away from the head portion 19.

The difference between the first height H1 of the first and fourth retaining members 6a, 6d and the second height H2 of the second and third retaining members 6b, 6c allows for an end of the first and second legs 21a, 21b to be accommodated between the retaining members 6a, 6b, 6c, 6d when they deflect inwardly, without compressing the first and second legs 21a, 21b. The second height H2 of the second and third retaining members 6b, 6c is below the position of the first and second legs 21a, 21b of the insert 3 when the insert 3 is received in the internal cavity 13 of the fastening clip 2 as shown in FIGS. 2(a) and 2(b). Thus, the second and third retaining members 6b, 6c do not contact the first and second legs 21a, 21b when the retaining members 6a, 6b, 6c, 6d are deflected inwardly.

FIGS. 2(a) and 2(b) show the fastening clip assembly 1 in an initial, pre-assembled position, before it is mounted to the hole of the component. In this configuration the insert 3 is inserted through the opening 14 in the top wall 7 of the head portion 4. Specifically, the legs 21a, 12b are inserted through the opening 14 and are disposed in the internal cavity 13 of the body portion 5 of the fastening clip 2.

In this initial position the engaging surfaces 25 of the legs 21a, 21b are in engagement with the bent sections 18a of the retaining members 6a, 6d within the internal cavity 13. Specifically, the engaging surfaces 25 are in engagement with the bent section 18a at the end 18 of the first and fourth retaining member 16a, 16d of the fastening clip 2.

The fastening clip assembly 1 can be actuated to a locked position during mounting of the fastening clip assembly 1 through the hole of the component. As the fastening clip 2 is pushed through the hole of the component, the retaining members 6a, 6b, 6c, 6d deflect inwardly. The legs 21a, 21b of the insert 3 also have protruding parts (not shown) which engage the sides of the hole and cause the legs 21a, 21b to deflect inwardly. The legs 21a, 21b then disengage with the retaining members 6a, 6d, allowing the insert 3 to be moved further into the internal cavity 13 to the locked position.

Figure 3:
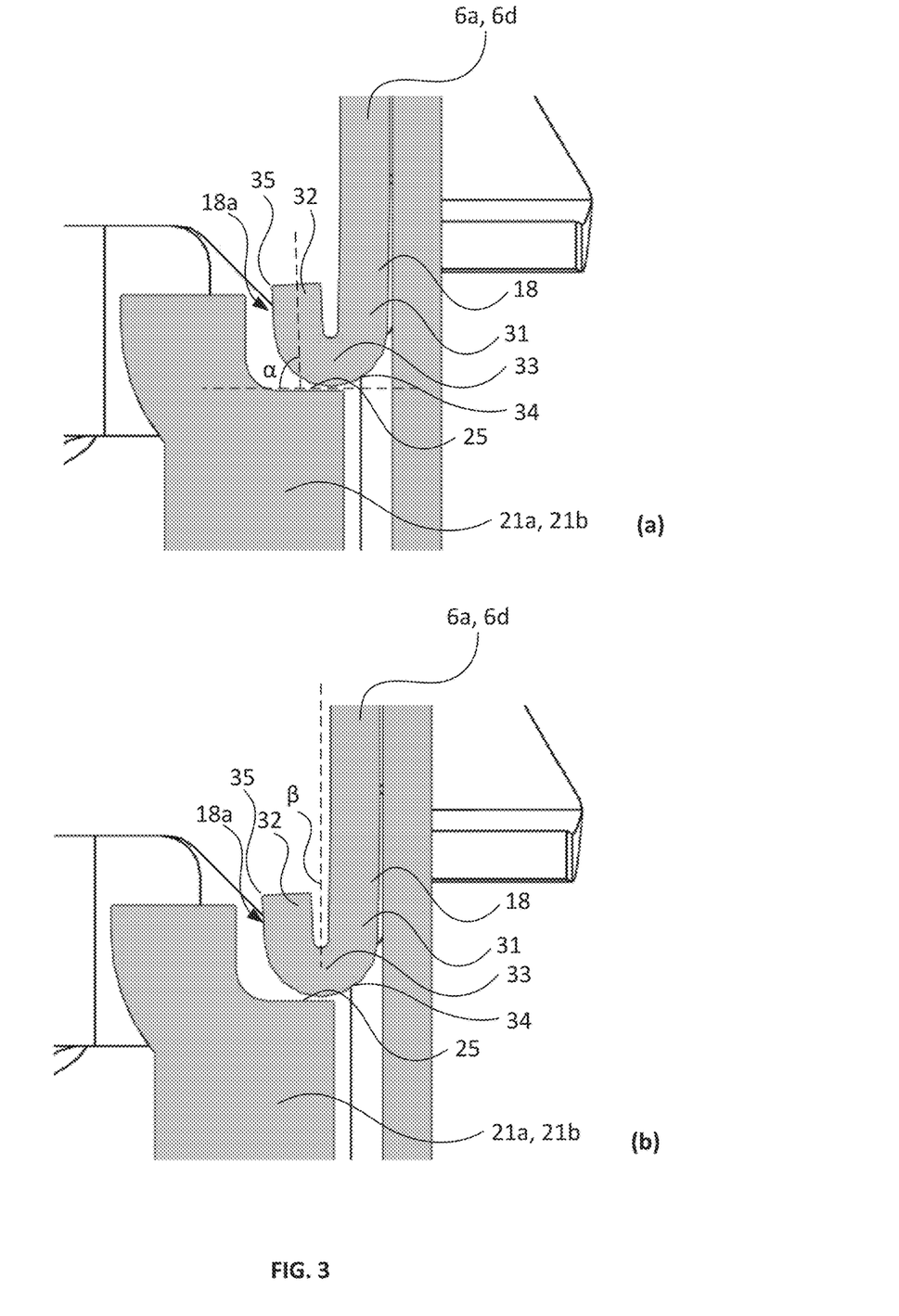

FIGS. 3(a) and 3(b) show an enlarged view of the bent section 18a of the first and fourth retaining members 6a, 6d, and the engaging surface 25 of the insert 3. The bent section 18a has a first portion 31 extending in a direction towards the head portion 4a, a second portion 32 extending at an angle relative to the first portion 31, and a curved portion 33 extending between first portion and the second portion. The curved portion 33 has a curved surface 34. The first portion 31 extends parallel to a central longitudinal axis of the fastening clip 2. In other examples, the first portion 31 may extend towards the head portion 4 of the fastening clip 2 and inwardly towards a central longitudinal axis of the clip 2. In other words, the first portion 31 may not extend parallel to the central longitudinal axis of the fastening clip 2. The curved surface 34 of the bent section 18a contacts the engaging surface 25 of the legs 21a, 21b.

As shown in FIG. 3(a), the second portion 32 of the bent section 18a extends at a first angle α relative to the engaging surface 25 of the insert 3. The bent section 18a is bent in a U-shape and the second portion 32 extends in a direction substantially perpendicular to the engaging surface 25. Accordingly, the first angle α is approximately 70 to 120 degrees. Preferably, the first angle α is approximately 80 to 90 degrees. More preferably, the first angle α is approximately 90 degrees. Thus, the second portion 32 extends away from the engaging surface 25 and an edge 35 of the retaining member 6a, 6d does not contact the engaging surface 25.

As shown in FIG. 3(b), the second portion 32 of the bent section 18a extends at a second angle β relative to the first portion 31 of the bent section 18a. The bent section 18a is bent in a U-shape and the second portion 32 extends in a substantially opposite direction to the direction of the first portion 31. Accordingly, the second angle β is approximately -10 to 10 degrees. Preferably, the second angle β is approximately 0 to 10 degrees. More preferably, the second angle β is approximately 10 degrees. Thus, the second portion 32 extends away from the engaging surface 25 and an edge 35 of the retaining member 6a, 6d does not contact the engaging surface 25.

Advantageously, when force is applied to the insert 3 during installation of the fastening clip assembly 1, the reaction force exerted by the fastening clip 2 onto the insert 3 is distributed to the engaging surface 25 by the curved surface 34. The edge 35 of the retaining member 6a, 6d does not contact the engaging surface 25. This prevents the edge 35 of the retaining member 6a, 6d from causing damage to the engaging surface 25 of the legs 21a, 21b during installation of the fastening clip assembly.

Figure 4:
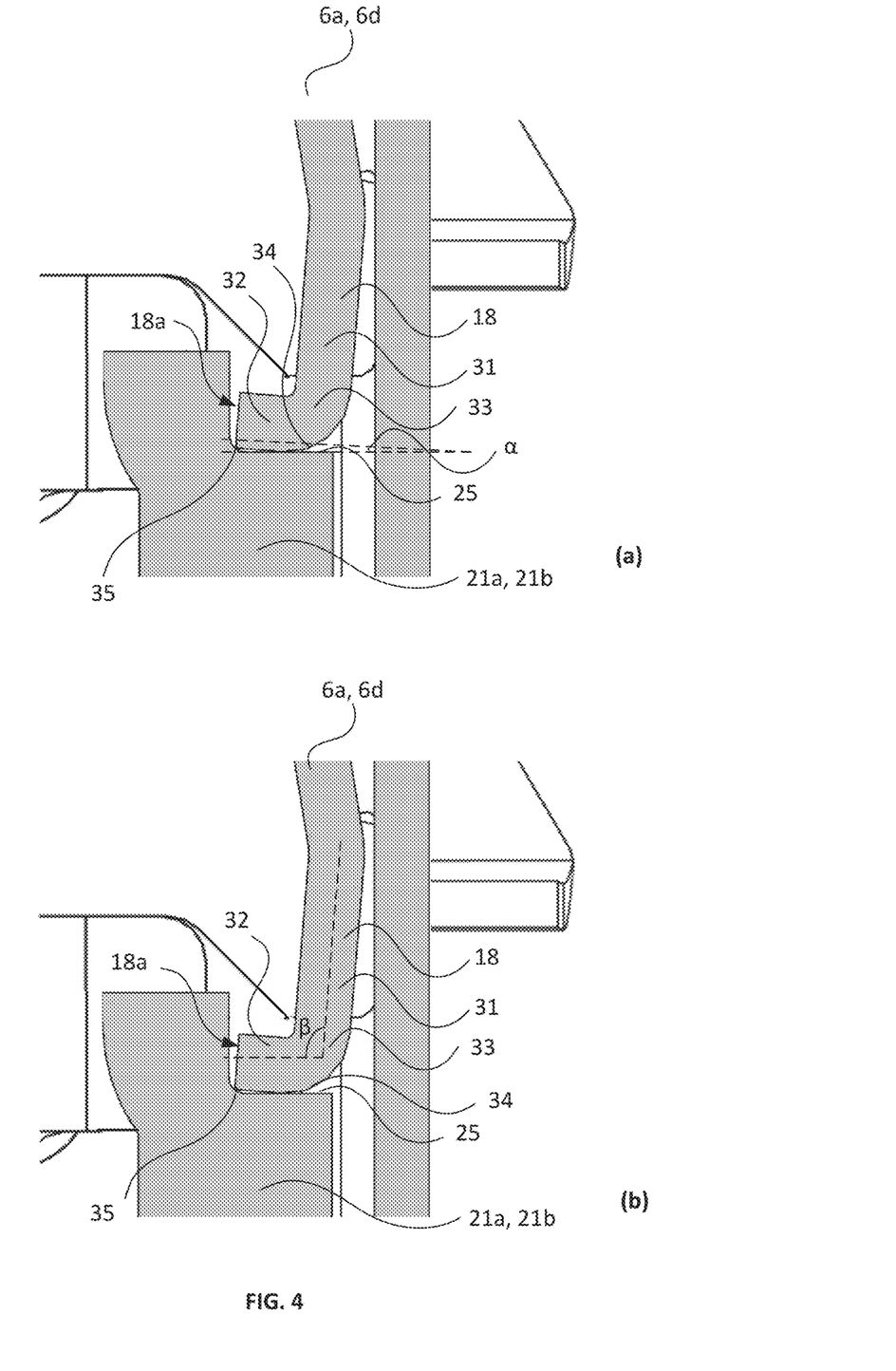

FIGS. 4(a) and 4(b) show an enlarged view of the bent section 18a of the first and fourth retaining members 6a, 6d according to an alternative example. The first portion 31 of the bent section 18a extends towards the head portion 4 of the fastening clip 2 and inwardly towards a central longitudinal axis of the clip 2. Thus, the first portion 31 does not extend parallel to the central longitudinal axis of the fastening clip 2. In other examples, the first portion 31 may extend parallel to the central longitudinal axis of the fastening clip 2.

As shown in FIG. 4(a), the second portion 32 of the bent section 18a extends at a first angle α relative to the engaging surface 25 of the insert 3. The bent section 18a is bent such that the second portion 32 extends in a direction substantially parallel to, or away from, the engaging surface 25. The first angle α is approximately 0 to 30 degrees. More preferably, the first angle α is approximately 0 to 10 degrees. Thus, the second portion 32 extends parallel to, or away from, the engaging surface 25 and an edge 35 of the retaining member 6a, 6d does not contact the engaging surface 25.

As shown in FIG. 4(b), the second portion 32 of the bent section 18a extends at a second angle β relative to the first portion 31 of the bent section 18a. The bent section 18a is bent such that the second portion 32 extends in a direction substantially perpendicular to the first portion 31. Accordingly, the second angle β is approximately 70 to 120 degrees. Preferably, the second angle β is approximately 80 to 90 degrees. More preferably, the second angle β is approximately 90 degrees. Thus, the second portion 32 extends parallel to, or away from, the engaging surface 25 and an edge 25 of the retaining member 6a, 6d does not contact the engaging surface 25.

Advantageously, when force is applied to the insert 3 during installation of the fastening clip assembly 1, the reaction force exerted by the fastening clip 2 onto the insert 3 is distributed to the engaging surface 25 by the curved surface 34 or a flat surface of the second portion 32. The edge 35 of the retaining member 6a, 6d does not contact the engaging surface 25. This prevents the edge 35 of the retaining member 6a, 6d from causing damage to the engaging surface 25 of the legs 21a, 21b during installation of the fastening clip assembly.

It will be appreciated by persons skilled in the art that the above examples have been described by way of example only and not in any limiting sense, and that various alterations and modifications are possible without departing from the scope of the disclosure as defined in the appended claims.

A further aspect of the disclosure is described in the below clauses, which are not to be confused with the claims:

Clause 1. A fastening clip (2) for mounting in a hole of a component, the fastening clip (2) comprising:
  a head portion (4) adapted to be positioned against a first surface of the component, and
  a body portion (5) for extending through the hole in the component, the body portion (5) comprising:
  an internal cavity (13),
  a first side (10a) with first and second elastically deflectable retaining members (6a, 6b) extending from the first side (10a) of the body portion (5), and
  a second side (10b), opposite to the first side (10a), with third and fourth elastically deflectable retaining members (6c, 6d) extending from the second side (10b) of the body portion (5) such that the third elastically deflectable retaining member (6c) is opposite to the first elastically deflectable retaining member (6a) and the fourth elastically deflectable retaining member (6d) is opposite to the second elastically deflectable retaining member (6b),
  wherein each of the elastically deflectable retaining members extend out of the internal cavity (13) and are deflectable inwardly as the body portion (5) is pushed through the hole of the component so as to engage a second surface of the component, opposite to the first surface, to retain the fastening clip in the hole of the component, and
  wherein, within the internal cavity (13), the first and fourth elastically deflectable retaining members extend to a first height towards the head portion (4), and the second and third elastically deflectable retaining members extend to a second height towards the head portion (4), and wherein the first height is greater than the second height such that the elastically deflectable retaining members do not collide as they are deflected inwardly during use.

Clause 2. A fastening clip assembly (1) for mounting in a hole of a component, the fastening clip assembly (1) comprising:
  the fastening clip (2) according to clause 1, and
  an insert (3) configured to be inserted through an opening in the head portion (4) of the fastening clip (2) and into the internal cavity (13).

Clause 3. The fastening clip assembly (1) according to clause 2, wherein the insert (3) comprises an engaging surface (25) arranged to engage one of the elastically deflectable retaining members within the internal cavity (13).

Clause 4. The fastening clip assembly (1) according to clause 3, wherein the insert (3) comprises a first leg (21a) comprising the engaging surface (25), and a second leg (21b) comprising a second engaging surface (25), and wherein the engaging surface (25) of the first leg (21a) is arranged to engage the first elastically deflectable retaining member (6a) and second engaging surface (25) of the second leg (21b) is arranged to engage the fourth elastically deflectable retaining member (6d).

Clause 5. The fastening clip assembly (1) according to clause 4, wherein the first leg (21a) is offset from the second leg (21b) such that the first leg (21a) is arranged to engage the first elastically deflectable retaining member (6a) and the second leg (21b) is arranged to engage the fourth elastically deflectable retaining member (6d).

Clause 6. The fastening clip assembly (1) according to any of clauses 3 to 5, wherein an end of at least one of the elastically deflectable retaining members comprises a bent section (18a).

Clause 7. The fastening clip assembly (1) according to clause 6, wherein the first and fourth elastically deflectable retaining members comprise the bent section (18a).

Clause 8. The fastening clip assembly (1) according to clause 6 or clause 7, wherein the bent section (18a) comprises a curved surface (34) configured to abut the engaging surface (25) of the insert (3) within the internal cavity (13).

Clause 9. The fastening clip assembly (1) according to any of clauses 6 to 8, wherein the bent section (18a) extends at a first angle (α) relative to the engaging surface (25) of the insert (3), and wherein the first angle (α) is from approximately 0 to 120 degrees relative to the engaging surface (25) such that an edge of the end of the elastically deflectable retaining member does not contact the engaging surface (25) when the insert (3) is located in the internal cavity (13).

Clause 10. The fastening clip assembly (1) according to any of clauses 6 to 9, wherein the bent section (18a) comprises a first portion (31) extending towards the head portion (4) of the fastening clip (2), a second portion (32) extending at an angle relative to the first portion (31), and a curved portion (33) extending between first portion (31) and the second portion (32).

Clause 11. The fastening clip assembly (1) according to clause 10, wherein the curved portion (33) comprises the curved surface (34).

Clause 12. The fastening clip assembly (1) according to clause 10 or clause 11, wherein the second portion (32) extends at an angle of approximately 0 to 90 degrees relative to the first portion (31).

Clause 13. The fastening clip assembly (1) according to clause 12, wherein the second portion (32) extends at an angle of approximately 80 to 90 degrees relative to the first portion (31).

Clause 14. The fastening clip assembly (1) according to clause 12, wherein the second portion (32) extends at an angle of approximately 0 to 10 degrees relative to the first portion (31).

Clause 15. The fastening clip assembly (1) according to any of clauses 3 to 14, wherein the insert (3) is moveable in the internal cavity (13) of the fastening clip (2) between:
- an initial position in which the engaging surface (25) engages one of the elastically deflectable retaining members for pushing the fastening clip assembly (1) into the hole of the component, and
- a locked position in which the engaging surface (25) does not engage the elastically deflectable retaining members.

What is claimed is:

1. A fastening clip assembly for mounting in a hole of a component, the fastening clip assembly comprising:
    a fastening clip, comprising a head portion adapted to be positioned against a first surface of the component and a body portion for extending through the hole in the component, the body portion comprising an internal cavity and one or more elastically deflectable retaining members extending out of the internal cavity to engage a second surface of the component, opposite to the first surface, to retain the fastening clip assembly in the hole of the component, and
    an insert, configured to be inserted through an opening in the head portion of the fastening clip and into the internal cavity;
        wherein the one or more elastically deflectable retaining members are adapted to deflect inwardly in a deflecting direction as the body portion is pushed through the hole of the component, and
        wherein the insert comprises an engaging surface arranged to engage an end of one of the one or more elastically deflectable retaining members within the internal cavity, and wherein the end of one or more of the elastically deflectable retaining members comprises a bent section.

2. The fastening clip assembly according to claim 1, wherein the bent section comprises a curved surface configured to abut the engaging surface of the insert within the internal cavity.

3. The fastening clip assembly according to claim 1, wherein the bent section extends at a first angle (α) relative to the engaging surface of the insert, and wherein the first angle (α) is from approximately 0 to 120 degrees relative to the engaging surface such that an edge of the end of the elastically deflectable retaining member does not contact the engaging surface when the insert is located in the internal cavity.

4. The fastening clip assembly according to claim 1, wherein the bent section of the one or more elastically deflectable retaining members comprises a first portion extending towards the head portion of the fastening clip, a second portion extending at an angle relative to the first portion, and a curved portion extending between first portion and the second portion.

5. The fastening clip assembly according to claim 4, wherein the curved portion comprises a curved surface.

6. The fastening clip assembly according to claim 4, wherein the second portion extends at an angle of approximately 0 to 90 degrees relative to the first portion.

7. The fastening clip assembly according to claim 6, wherein the second portion extends at an angle of approximately 80 to 90 degrees relative to the first portion.

8. The fastening clip assembly according to claim 6, wherein the second portion extends at an angle of approximately 0 to 10 degrees relative to the first portion.

9. The fastening clip assembly according to claim 1, wherein the body portion comprises:
    a first side, with first and second elastically deflectable retaining members extending from the first side of the body portion, and
    a second side, opposite to the first side, with third and fourth elastically deflectable retaining members extending from the second side of the body portion such that the third elastically deflectable retaining member is opposite to the first elastically deflectable retaining member and the fourth elastically deflectable retaining member is opposite to the second elastically deflectable retaining member.

10. The fastening clip assembly according to claim 9, wherein, within the internal cavity, the first and fourth elastically deflectable retaining members extend to a first height towards the head portion, and the second and third elastically deflectable retaining members extend to a second height towards the head portion, and wherein the first height is greater than the second height such that the elastically deflectable retaining members do not collide as they are deflected inwardly during use.

11. The fastening clip assembly according to claim 9, wherein the first and fourth elastically deflectable retaining members comprise the bent section.

12. The fastener clip according to claim 9, wherein the insert comprises a first leg comprising the engaging surface, and a second leg comprising a second engaging surface, and wherein the engaging surface of the first leg is arranged to engage the first elastically deflectable retaining member and second engaging surface of the second leg is arranged to engage the fourth elastically deflectable retaining member.

13. The fastener clip according to claim 12, wherein the first leg is offset from the second leg such that the first leg is arranged to engage the first elastically deflectable retaining member and the second leg is arranged to engage the fourth elastically deflectable retaining member.

14. The fastening clip assembly according to claim 1, wherein the insert is moveable in the internal cavity of the fastening clip between:
- an initial position, in which the engaging surface engages the bent section of one of the one or more elastically deflectable retaining members for pushing the fastening clip assembly into the hole of the component, and
- a locked position, in which the engaging surface does not engage the bent section of the one of the one or more elastically deflectable retaining members.

* * * * *